United States Patent
Cox et al.

(10) Patent No.: US 8,006,482 B2
(45) Date of Patent: Aug. 30, 2011

(54) METHOD OF PURGING FLUID INJECTOR BY HEATING

(75) Inventors: Glenn Brian Cox, Peoria, IL (US);
James Richard Weber, Lacon, IL (US);
Orhan Altin, Peoria, IL (US); Roger Leroy Urven, Jr., Colona, IL (US);
Andrew John Kieser, Peterborough (GB); Justin Werner McMenamy, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 856 days.

(21) Appl. No.: 11/979,711

(22) Filed: Nov. 7, 2007

(65) Prior Publication Data
US 2008/0209890 A1 Sep. 4, 2008

Related U.S. Application Data

(60) Provisional application No. 60/904,371, filed on Mar. 2, 2007.

(51) Int. Cl.
*F01N 3/00* (2006.01)
(52) U.S. Cl. ........ 60/286; 60/274; 60/295; 60/298; 60/303; 239/125; 239/128; 239/130; 239/135
(58) Field of Classification Search .......... 60/274, 60/286, 295, 297, 298, 303, 320; 239/125, 239/127.1, 128, 129, 130, 135
See application file for complete search history.

(56) References Cited

U.S. PATENT DOCUMENTS

| | | |
|---|---|---|
| 1,375,646 A | 4/1921 | Belinski |
| 3,762,378 A | 10/1973 | Bitonti |
| 4,533,316 A | 8/1985 | Takino et al. |
| 4,622,811 A | 11/1986 | Distel et al. |
| 4,787,349 A | 11/1988 | Hilger |
| 4,834,043 A | 5/1989 | Kaczynski et al. |
| 4,870,943 A | 10/1989 | Bradley |
| 4,987,738 A | 1/1991 | Lopez-Crevillen et al. |
| 5,001,899 A | 3/1991 | Santiago et al. |
| 5,263,325 A | 11/1993 | McVey et al. |
| 5,353,591 A | 10/1994 | Kabasin et al. |
| 5,571,484 A | 11/1996 | Pettit et al. |
| 5,665,318 A * | 9/1997 | Rembold et al. ............... 422/177 |
| 5,771,689 A | 6/1998 | Bareis et al. |

(Continued)

FOREIGN PATENT DOCUMENTS

DE 42 30 056 3/1994

(Continued)

OTHER PUBLICATIONS

U.S. Appl. No. 11/819,882, filed Jun. 29, 2007, "Regeneration System Having Integral Purge and Ignition Device," pp. 1-19, Figs. 1-5.

(Continued)

*Primary Examiner* — Binh Q Tran
(74) *Attorney, Agent, or Firm* — Finnegan, Henderson, Farabow, Garrett & Dunner LLP (57) ABSTRACT

A fluid injector for use in an exhaust treatment system is disclosed. The fluid injector may have a nozzle portion, a heater associated with the nozzle portion, and a controller in communication with the heater. The controller may be configured to recognize a condition triggering a purge event of the fluid injector. The controller may also be configured to activate the heater to purge the fluid injector in response to the recognized condition.

23 Claims, 6 Drawing Sheets

U.S. PATENT DOCUMENTS

| | | | |
|---|---|---|---|
| 5,832,715 | A | 11/1998 | Dev |
| 5,992,141 | A * | 11/1999 | Berriman et al. .............. 60/274 |
| 6,125,624 | A | 10/2000 | Prociw |
| 6,289,869 | B1 | 9/2001 | Elliott |
| 6,439,191 | B1 | 8/2002 | Elliott |
| 6,592,052 | B2 | 7/2003 | Hokao |
| 6,688,533 | B2 | 2/2004 | Nines et al. |
| 6,698,191 | B2 | 3/2004 | Xu et al. |
| 6,823,663 | B2 * | 11/2004 | Hammerle et al. ........... 60/286 |
| 7,000,383 | B2 * | 2/2006 | van Nieuwstadt et al. ..... 60/286 |
| 7,406,822 | B2 | 8/2008 | Funke et al. |
| 7,481,048 | B2 | 1/2009 | Harmon et al. |
| 7,509,799 | B2 * | 3/2009 | Amou et al. ................... 60/286 |
| 7,628,011 | B2 * | 12/2009 | Crawley et al. ................ 60/295 |
| 7,685,810 | B2 * | 3/2010 | Hirata et al. ................... 60/277 |
| 2004/0098973 | A1 | 5/2004 | Tennison et al. |
| 2004/0098975 | A1 | 5/2004 | van Nieuwstadt et al. |
| 2006/0156733 | A1 | 7/2006 | Prociw et al. |
| 2008/0209897 | A1 | 9/2008 | Urven et al. |
| 2009/0000605 | A1 | 1/2009 | Craig et al. |

FOREIGN PATENT DOCUMENTS

| | | |
|---|---|---|
| DE | 19855385 A1 | 6/2000 |
| DE | 10330913 A1 | 1/2005 |
| DE | 103 42 003 | 3/2005 |
| EP | 1 655 463 | 5/2006 |
| GB | 2386845 A | 10/2003 |
| JP | 59 000517 | 1/1984 |
| JP | 61-119918 A | 6/1986 |
| JP | 05 033629 | 2/1993 |
| JP | 95-018549 B | 3/1995 |
| JP | 2005 180371 | 7/2005 |
| WO | WO 2005/025725 A1 | 3/2005 |
| WO | WO 2005/070175 A2 | 8/2005 |

OTHER PUBLICATIONS

U.S. Appl. No. 11/979,709, filed Nov. 7, 2007, "Fluid Injector Having Purge Heater," pp. 1-29, Figs. 1-6.

* cited by examiner

METHOD OF PURGING FLUID INJECTOR BY HEATING

RELATED APPLICATION

This application is based upon and claims the benefit of priority from U.S. Provisional Application No. 60/904,371 filed on Mar. 2, 2007, the entire contents of which are incorporated herein by reference.

TECHNICAL FIELD

The present disclosure is directed to a method of purging and, more particularly, to a method of purging a fluid injector by selectively heating the injector.

BACKGROUND

Engines, including diesel engines, gasoline engines, gaseous fuel powered engines, and other engines known in the art exhaust a complex mixture of air pollutants. These air pollutants include solid material known as particulate matter or soot. Due to increased attention on the environment, exhaust emission standards have become more stringent and the amount of particulate matter emitted from an engine is regulated depending on the type of engine, size of engine, and/or class of engine.

One method implemented by engine manufacturers to comply with the regulation of particulate matter exhausted to the environment has been to remove the particulate matter from the exhaust flow of an engine with a device called a particulate trap or diesel particulate filter. A particulate trap is a filter designed to trap particulate matter and typically consists of a wire mesh or ceramic honeycomb medium. However, the use of the particulate trap for extended periods of time may cause the particulate matter to build up in the medium, thereby reducing the functionality of the filter and subsequent engine performance.

The collected particulate matter may be removed from the filter through a process called regeneration. To initiate regeneration of the filter, the temperature of the particulate matter trapped within the filter must be elevated to a combustion threshold, at which the particulate matter is burned away. One way to elevate the temperature of the particulate matter is to inject a catalyst such as diesel fuel into the exhaust flow of the engine and ignite the injected fuel.

After the regeneration event, the supply of fuel is shut off. However, some fuel may remain within the fuel injector or the fuel lines that direct fuel to the injector. This remaining fuel, when subjected to the harsh conditions of the exhaust stream may coke or be partially burned, leaving behind a solid residue that can restrict or even block the fuel injector. In addition, it may be possible for particulate matter from the exhaust flow to enter and block the injector. For this reason, it may be necessary to periodically purge the injector of fuel and/or any built up residue or particulate matter between regeneration events.

One method of purging a fuel injector is described in U.S. Pat. No. 4,987,738 (the '738 patent) issued to Lopez-Crevillen et al. on Jan. 29, 1991. Specifically, the '738 patent discloses a particulate filter having a burner used to incinerate trapped particulates. The burner includes a fuel injector nozzle for injecting fuel into the burner during regeneration. As illustrated in FIG. 1 of the '738 patent, a fuel pump supplies fuel to the injector nozzle via a passageway axially aligned with a bore of the nozzle. In order to maintain efficient and reliable operation of the burner, a supply of purge air is directed through the axially aligned passageway to the fuel injector nozzle following a regeneration event to purge the nozzle of fuel. Purge air continues to flow through the injector nozzle until a subsequent regeneration event.

Although the burner of the '738 patent may benefit somewhat from the purging process described above, the gain may be more expensive. In particular, the additional passageways required to support the air purging may increase machining cost, component cost, and assembly time. And, the continuous flow of purge air may be expensive to maintain and increase the risk of debris fowling the injector nozzle.

The method of the present disclosure solves one or more of the problems set forth above.

SUMMARY

One aspect of the present disclosure is directed to a fluid injector for use with an exhaust treatment system. The fluid injector may include a nozzle portion, a heater associated with the nozzle portion, and a controller in communication with the heater. The controller may be configured to recognize a condition triggering a purge event of the fluid injector. The controller may also be configured to activate the heater to purge the fluid injector in response to the recognized condition.

Another aspect of the present disclosure is directed to a method of purging a fluid injector for use in an exhaust treatment system. The method may include recognizing a condition triggering a purge event of the fluid injector in the exhaust treatment system. The method may also include heating the fluid injector in response to the recognized condition.

DETAILED DESCRIPTION

Figure 1:
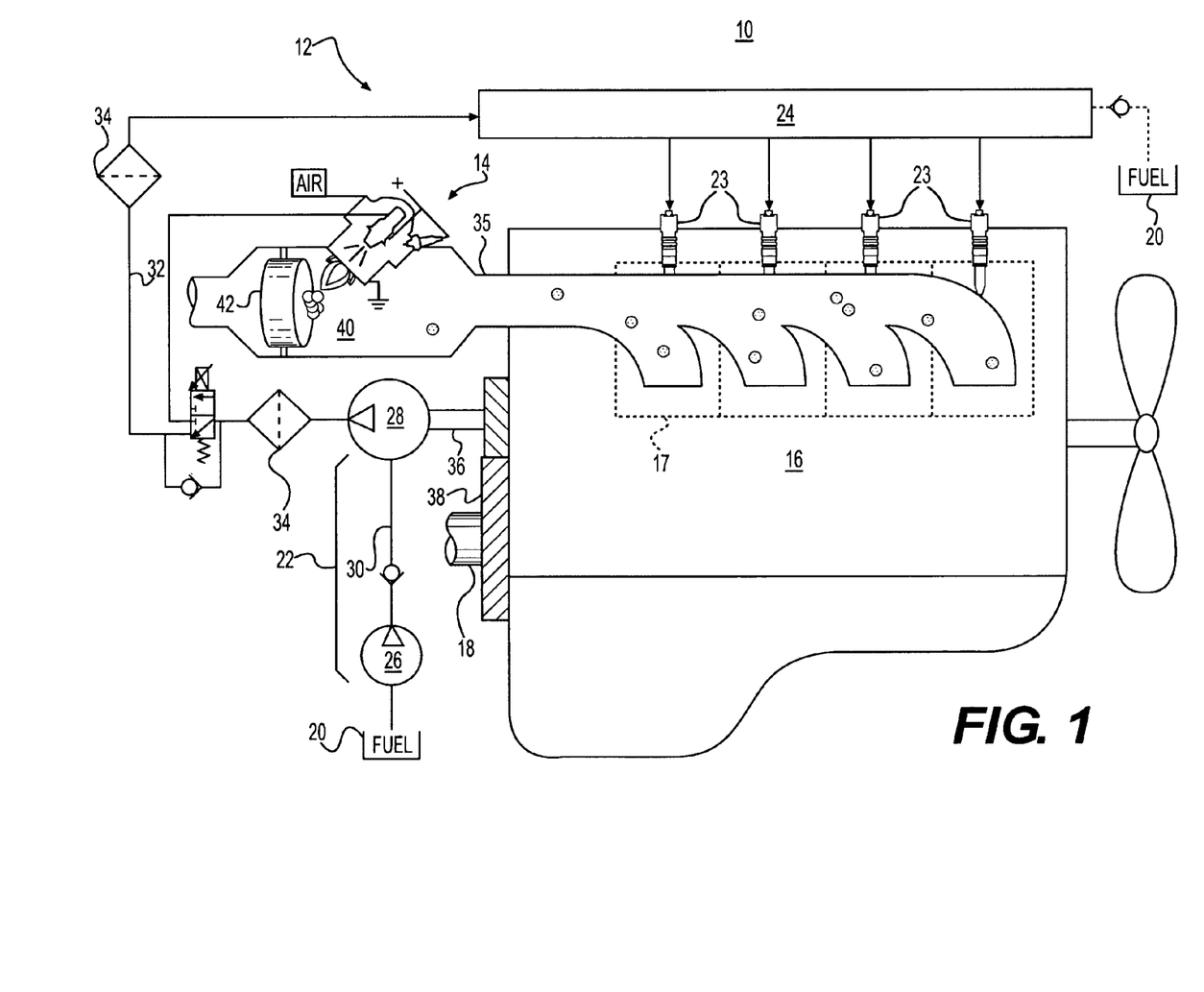
FIG. 1 is a schematic and diagrammatic illustration of an exemplary disclosed power unit.

FIG. 1 illustrates a power unit 10 having a fuel system 12 and an auxiliary regeneration system 14. For the purposes of this disclosure, power unit 10 is depicted and described as a four-stroke diesel engine. One skilled in the art will recognize, however, that power unit 10 may be any other type of internal combustion engine such as, for example, a gasoline or a gaseous fuel-powered engine. Power unit 10 may include an engine block 16 that at least partially defines a plurality of combustion chambers 17. In the illustrated embodiment, power unit 10 includes four combustion chambers 17. However, it is contemplated that power unit 10 may include a greater or lesser number of combustion chambers 17 and that combustion chambers 17 may be disposed in an "in-line" configuration, a "V" configuration, or any other suitable configuration.

As also shown in FIG. 1, power unit 10 may include a crankshaft 18 that is rotatably disposed within engine block 16. A connecting rod (not shown) may connect a plurality of pistons (not shown) to crankshaft 18 so that a sliding motion of each piston within the respective combustion chamber 17 results in a rotation of crankshaft 18. Similarly, a rotation of crankshaft 18 may result in a sliding motion of the pistons.

Fuel system 12 may include components that cooperate to deliver injections of pressurized fuel into each of combustion chambers 17. Specifically, fuel system 12 may be a common rail system and include a tank 20 configured to hold a supply of fuel, and a fuel pumping arrangement 22 configured to pressurize the fuel and direct the pressurized fuel to a plurality of fuel injectors 23 by way of a rail 24.

Fuel pumping arrangement 22 may include one or more pumping devices that function to increase the pressure of the fuel and direct one or more pressurized streams of fuel to rail 24. In one example, fuel pumping arrangement 22 includes a low pressure source 26 and a high pressure source 28 disposed in series and fluidly connected by way of a fuel line 30. Low pressure source 26 may embody a transfer pump that provides low pressure feed to high pressure source 28. High pressure source 28 may receive the low pressure feed and increase the pressure of the fuel up to as much as 300 MPa in some cases. High pressure source 28 may be connected to rail 24 by way of a fuel line 32. One or more filtering elements 34, such as a primary filter and a secondary filter, may be disposed within fuel line 32 in series relation to remove debris and/or water from the fuel pressurized by fuel pumping arrangement 22.

One or both of low and high pressure sources 26, 28 may be operatively connected to power unit 10 and driven by crankshaft 18. Low and/or high pressure sources 26, 28 may be connected with crankshaft 18 in any manner readily apparent to one skilled in the art where a rotation of crankshaft 18 will result in a corresponding driving rotation of a pump shaft. For example, a pump driveshaft 36 of high pressure source 28 is shown in FIG. 1 as being connected to crankshaft 18 through a gear train 38. It is contemplated, however, that one or both of low and high pressure sources 26, 28 may alternatively be driven electrically, hydraulically, pneumatically, or in any other appropriate manner. It is further contemplated that fuel system 12 may alternatively embody another type of fuel system such as, for example, a mechanical unit fuel injector system or a hydraulic unit fuel injector system where the pressure of the injected fuel is generated or enhanced within individual injectors without the use of a high pressure source.

Auxiliary regeneration system 14 may be associated with an exhaust treatment device 40. In particular, exhaust from power unit 10 may be communicated via exhaust passageway 35 to an end portion of exhaust passageway 35 (not shown), where the exhaust may be released into the atmosphere. Prior to reaching the end portion of exhaust passageway 35, the exhaust may pass through exhaust treatment device 40. In exhaust treatment device 40 exhaust constituents, such as particulate matter, NOx, HC, and other constituents, may be removed from the exhaust flow or otherwise converted to innocuous gases. In one example, exhaust treatment device 40 may include a wire mesh or ceramic honeycomb filtration medium 42 situated to remove particulate matter from the exhaust flow. Over time, the particulate matter may build up in filtration medium 42 and, if left unchecked, the particulate matter buildup could be significant enough to restrict or even block the flow of exhaust through treatment device 40, allowing backpressure within power unit 10 to increase. An increase in the backpressure of power unit 10 could reduce the power unit's ability to draw in fresh air, resulting in decreased performance, increased exhaust temperatures, and poor fuel consumption.

Figure 2:
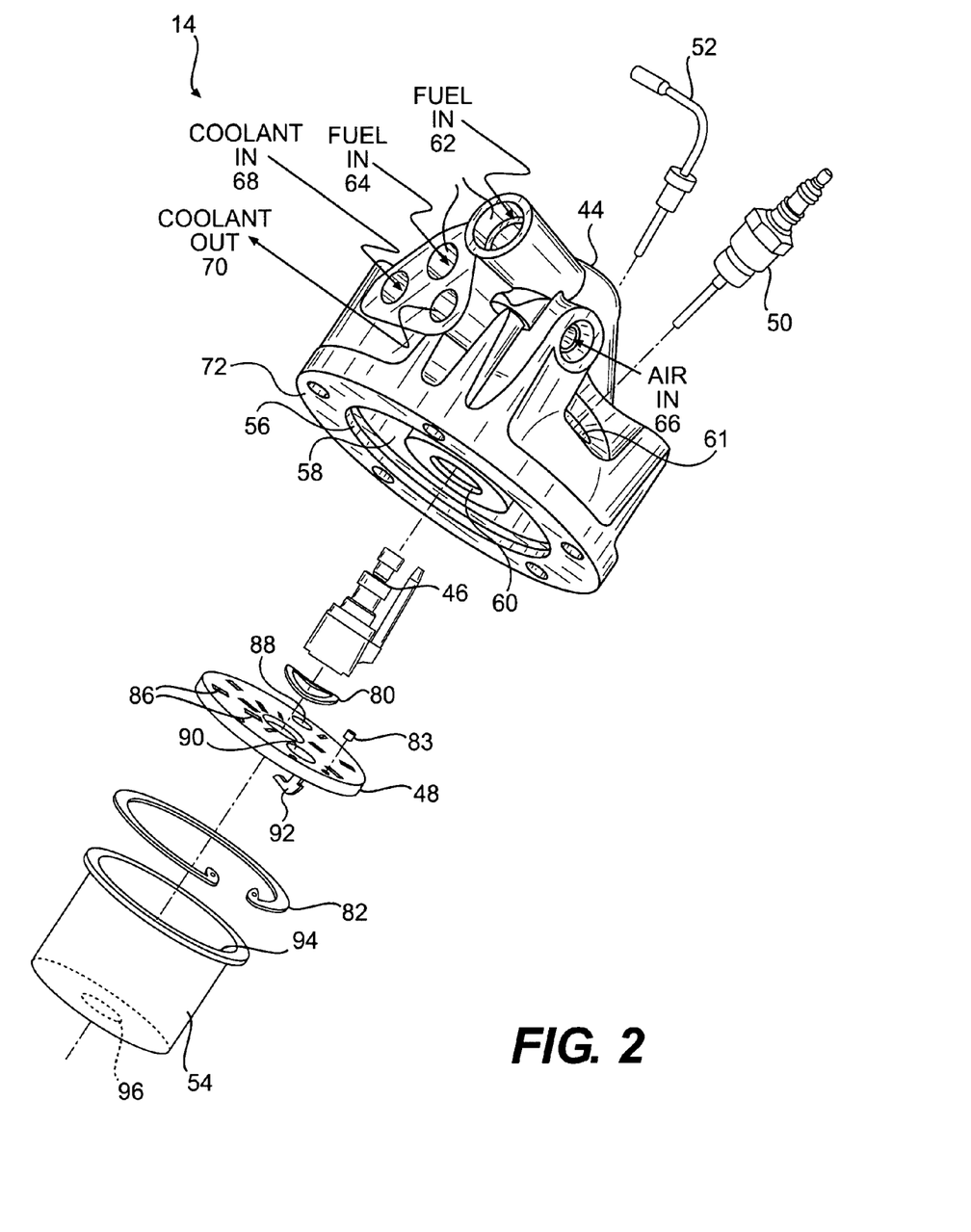
FIG. 2 is an exploded view illustration of an exemplary disclosed exhaust treatment device for use with the power unit of FIG. 1.

As illustrated in FIG. 2, auxiliary regeneration system 14 may include components that cooperate to periodically reduce the buildup of particulate matter within exhaust treatment device 40. These components may include, among other things, a housing 44, an injector 46, a mixing plate 48, a spark plug 50, a thermocouple 52, and a combustion canister 54. It is contemplated that auxiliary regeneration system 14 may include additional or different components such as, for example, one or more pilot injectors, additional main injectors, a controller, a pressure sensor, a flow sensor, a flow blocking device, and other components known in the art. It is further contemplated that instead of or in addition to filtration medium 42 (see FIG. 1), exhaust treatment device 40 may include a Selective Catalytic Reduction (SCR) device and an associated injector (not shown) nearly identical to injector 46 for introducing a reductant, such as, for example, urea into the exhaust flow upstream of the SCR device.

Housing 44 may receive and fluidly interconnect injector 46, mixing plate 48, spark plug 50, and thermocouple 52. In particular, housing 44 may have a central stepped bore 56, an annular recessed opening 58, a centrally located bore 60, a first radially offset bore 61, and a second radially offset bore (not shown). Housing 44 may also include a pilot fuel passage 62, a main fuel passage 64, an air supply passage 66, and inlet and outlet cooling passages 68 and 70, respectively. One or more check valves (not shown) may be situated in any one or all of these passages, if desired, to ensure unidirectional flow of the respective fluids within the passages and/or to reduce or minimize the volumes thereof that could require periodic re-supplying or purging.

Centrally located bore 60 may receive injector 46 through an inner surface 72 (referring to the surface of housing 44 illustrated in FIG. 2 as being open to combustion canister 54). Centrally located bore 60, together with injector 46 may form a pilot fuel chamber 74 (referring to FIG. 3), a main fuel chamber 76, and a coolant chamber 78 within the steps of bore 60. Pilot fuel chamber 74 may be fluidly communicated with pilot fuel passage 62, while main fuel chamber 76 may be fluidly communicated with main fuel passage 64. Coolant chamber 78 may be fluidly communicated with both the inlet and outlet cooling passages 68, 70. Mixing plate 48 may retain injector 46 within centrally located bore 60 by way of a resilient member such as a bellville washer 80.

Central stepped bore 56 may receive mixing plate 48 also through inner surface 72. Mixing plate 48 may be press-fit completely within central stepped bore 56 and/or held in place with a snap ring 82. Mixing plate 48 may be centrally aligned with injector 46 and housing 44, and angularly oriented with respect to housing 44 by way of one or more dowel pins 83.

First radially offset bore 61 may receive spark plug 50 through an external surface of housing 44. In particular, spark plug 50 may include external threads that engage internal threads of first radially offset bore 61. First radially offset bore 61 may be in communication with air supply passage 66, if desired, such that carbon and other contaminates may be periodically purged from first radially offset bore 61 and, thereby, prevented from building on spark plug 50 and causing unintentional arcing.

The second radially offset bore may receive thermocouple 52 through the external surface of housing 44. Similar to spark plug 50, thermocouple 52 may also have external threads that engage internal threads of the second radially located bore. Although no passages are illustrated as communicating fluids with thermocouple 52, it is contemplated that purge fluid such as air from supply passage 66 may alternatively or additionally be directed to the second radially offset bore to reduce or minimize the buildup of contaminates therein, if desired.

Injector 46 may be disposed within housing 44 and operable to inject one or more amounts of pressurized fuel (e.g., such as through pilot, main, and/or post injections) into combustion canister 54 at predetermined timings, fuel pressures, and fuel flow rates. The timing of fuel injection into combustion canister 54 may be synchronized with sensory input received from thermocouple 52, one or more pressure sensors (not shown), a timer (not shown), or any other similar sensory devices such that the injections of fuel substantially correspond with a buildup of particulate matter within filtration medium 42 (referring to FIG. 1). For example, fuel may be injected as the temperature of the exhaust flowing through exhaust treatment device 40 exceeds a predetermined value. Alternatively or additionally, fuel may be injected as a pressure of the exhaust flowing through exhaust treatment device 40 exceeds a predetermined pressure level or a pressure drop across filtration medium 42 exceeds a predetermined differential value. It is contemplated that fuel may also be injected on a set periodic basis, in addition to or regardless of pressure and temperature conditions, if desired.

Mixing plate 48 (e.g., a swirl plate), together with annular recessed opening 58 of housing 44, may form an air distribution passage 84 (referring to FIG. 3), which may be supplied with compressed air via supply passage 66. Mixing plate 48 may include a plurality of annularly disposed air vents 86 fluidly communicating air distribution passage 84 with combustion canister 54. Air vents 86 may mix air with injections of fuel inside combustion canister 54 to improve combustion therein. It is contemplated that air vents 86 may additionally or alternatively direct pressurized air to the outer periphery of combustion canister 54 for cooling and/or insulating purposes, if desired.

Mixing plate 48 may include openings to accommodate thermocouple 52 and spark plug 50. Specifically, thermocouple 52 may extend into combustion canister 54 via a first through hole 88 in mixing plate 48, while spark plug 50 may extend into combustion canister 54 via a second through hole 90. A grounded electrode 92 may extend from mixing plate 48 proximal second through hole 90 to interact with spark plug 50.

Spark plug 50 may facilitate ignition of fuel sprayed from injector 46 into combustion canister 54. Specifically, during a regeneration event or when a catalyst within exhaust treatment device 40 requires an elevated temperature, the temperature of the exhaust exiting power unit 10 may be too low to cause auto-ignition of the fuel sprayed from injector 46. To initiate combustion of the fuel and, subsequently, the trapped particulate matter, a small quantity (i.e., a pilot shot) of fuel from injector 46 may be sprayed or otherwise injected toward spark plug 50 to create a locally rich atmosphere readily ignitable by spark plug 50. A spark developed between an electrode of spark plug 50 and grounded electrode 92 of mixing plate 48 may ignite the locally rich atmosphere creating a flame, which may be jetted or otherwise advanced toward the trapped particulate matter. The flame jet propagating from injector 46 may raise the temperature within exhaust treatment device 40 to a level that readily supports efficient ignition of a larger quantity (i.e., a main shot) of fuel from injector 46. As the main injection of fuel ignites, the temperature within exhaust treatment device 40 may continue to rise to a level that causes combustion of the particulate matter trapped within filtration medium 42 and/or to a level that supports efficient operation of a catalyst.

Thermocouple or temperature sensor 52 may confirm successful ignition of the fuel/air mixture within combustion canister 54 and help to control an injection quantity of fuel based on an achieved temperature. A thermocouple generally includes two dissimilar metals, often embodied in slender members such as wires or rods. The two metals of the thermocouple may be joined at a measuring end of the thermocouple (usually the terminal end) via a soldered junction. When the temperature at the measuring end of the thermocouple changes relative to the temperature at a reference end (i.e., non-measuring end), a measurable voltage may be generated. The value of the measured voltage may be used to determine a temperature at the measuring end of the thermocouple. Thermocouple 52 may extend through mixing plate 48 into combustion canister 54 for indicating the temperature therein. When a temperature measured within combustion canister 54 exceeds a predetermined value, it can be concluded that ignition of the air-fuel mixture has been achieved. Similarly, when the temperature measured within combustion canister 54 drops below the predetermined value, it can be concluded that the flame jet has been extinguished. It is contemplated that the injections of fuel into combustion canister 54, the flow rate or pressure of air directed into combustion canister 54, a temperature of injector 46, and/or other temperature dependent operations may be varied in response to the value of the current generated by thermocouple 52.

Combustion canister 54 (referring to FIG. 2) may embody a tubular member configured to axially direct an ignited fuel/air mixture (i.e., the flame jet) from auxiliary regeneration system 14 into the exhaust flow of treatment device 40. In particular, combustion canister 54 may include a central opening 94 that fluidly communicates fuel from injector 46 and air from distribution passage 84 with the exhaust (i.e., central opening 94 may fluidly communicate with or be coextensive with passageway 35). Combustion canister 54 may employ a flame stabilizing plate 96 at one end of central opening 94 to provide a restriction that reduces or minimizes pulsations within exhaust treatment device 40. That is, the inner diameter of flame stabilizing plate 96 may be less than the inner diameter of central opening 94. Combustion canister 54 may be generally straight and have a predetermined length set during manufacture according to a desired flame introduction location (the distance that a flame resulting from the ignition of the fuel/air mixture extends from combustion canister 54 into the exhaust flow). In one example, this desired introduction location may be about 12 inches from flame stabilizing plate 96 of combustion canister 54.

Figure 4:
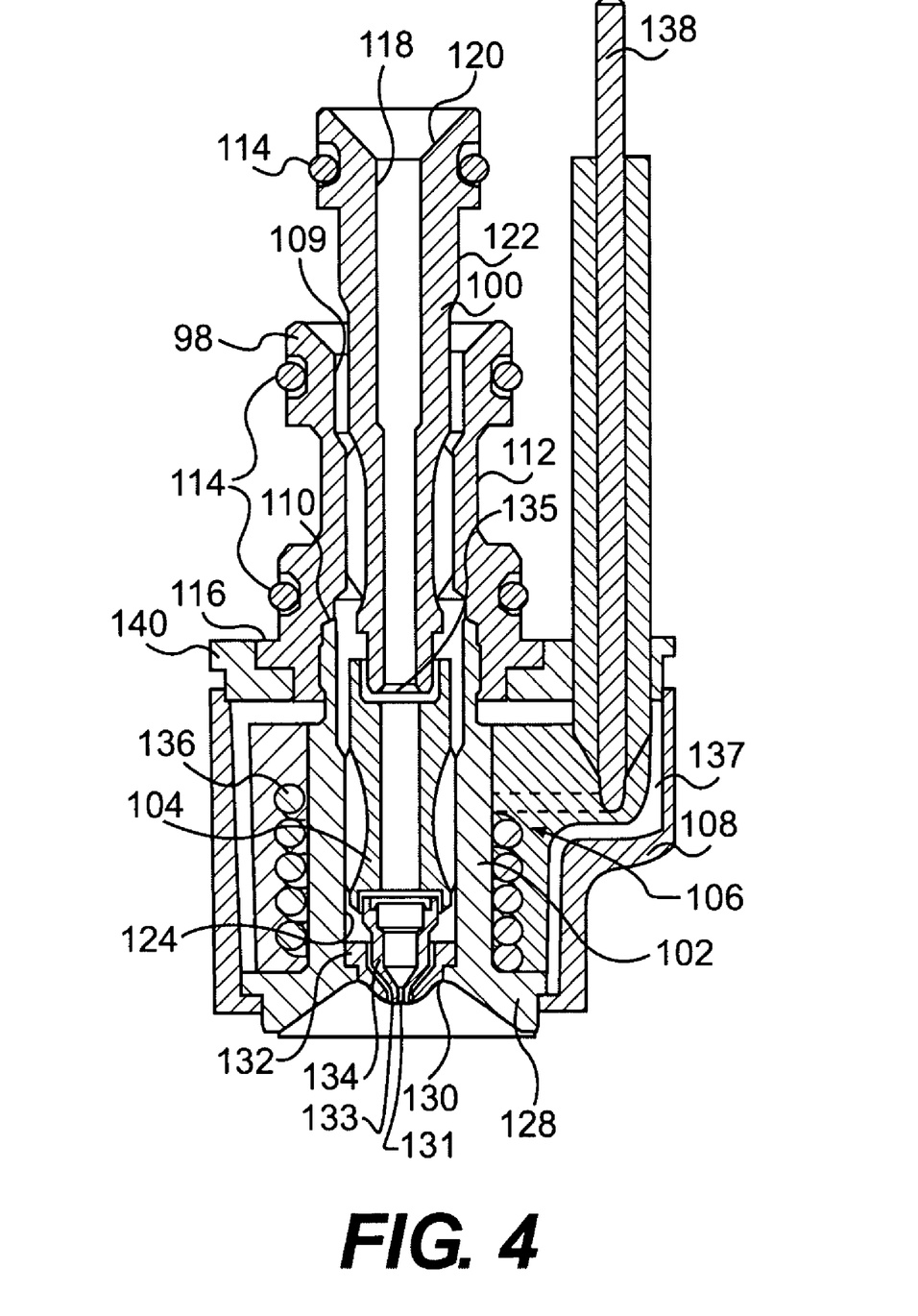
FIG. 4 is a cross-sectional illustration of a fluid injector for use with the device of FIGS. 2 and 3.

As illustrated in FIG. 4, injector 46 may be an assembly of multiple components that interact to ensure continued injections of fuel into combustion canister 54 (referring to FIG. 2), even under harsh operating conditions. Specifically, injector 46 may include a body 98, a cooled pin member 100 disposed within body 98, a sleeve 102, a selectively heated pin member 104 disposed within sleeve 102, a heater 106 press-fit onto or otherwise coupled to sleeve 102, and a heat shield 108 disposed about heater 106. Pressurized fuel may be directed into and around cooled pin member 100 toward heated pin member 104 for injection, while coolant may be directed around body 98 to prevent coking of fuel within cooled pin member 100. Between injection events, current may be selectively applied to heater 106 to evaporate and/or burn away any residual fuel or buildup within heated pin member 104 (i.e., purge a fluid injecting end of injector 46). External surfaces of injector 46 may also be purged of deposits and fuel, thereby maintaining spray angle and quality. Heat shield 108 may reduce or minimize the amount of heat convected and/or radiated away from heater 106 during the purge process.

Body 98 may be a generally cylindrical member configured for assembly within centrally located bore 60 (referring to FIG. 2) and may include one or more passages. Specifically, body 98 may include a bore 109 configured to threadingly receive cooled pin member 100, and a connected bore 110 configured to threadingly receive an end of sleeve 102. Body 98 may have external surfaces of enlarged diameters at opposing ends such that a recess 112 is created therebetween. Recess 112 may at least partially define coolant chamber 78 (referring to FIG. 3). That is, coolant from inlet cooling passage 68 may be directly in contact with the external annular surface of body 98 at recess 112. One or more sealing members 114 may be associated with the enlarged areas of body 98 to reduce or minimize fluid leakage and contamination between body 98 and housing 44. A flange 116 may help to correctly position body 98 within centrally located bore 60.

Cooled pin member 100 may be an elongated cylindrical member that is slidingly disposed within centrally located bore 60 (referring to FIG. 3) and threadingly engaged with body 98. The engagement location of cooled pin member 100 with body 98 may substantially correspond with the axial location of recess 112 and coolant chamber 78 (referring to FIG. 3). In this manner, any heat generated within or transferred to cooled pin member 100 may be conducted through the engagement to the coolant within chamber 78 (referring to FIG. 3). Cooled pin member 100 may include an internal passage 118 originating with a female taper 120 at pilot fuel chamber 74 (referring to FIG. 3) and terminating at a receiving end of heated pin member 104. Cooled pin member 100 may also have an external surface of enlarged diameter at a fuel receiving end such that a recess 122 is created between the enlarged surfaces of cooled pin member 100 and body 98. Recess 122 may at least partially define main fuel chamber 76, while the space within centrally located bore 60 located at an axial upstream location of the enlarged diameter of cooled pin member 100 may at least partially define pilot fuel chamber 74 (referring to FIG. 3). Similar to body 98, one or more sealing members 114 may be associated with the enlarged area of cooled pin member 100 to reduce or minimize fluid leakage and contamination between cooled pin member 100 and housing 44.

Sleeve 102 may embody a generally tubular member fixedly connecting heated pin member 104 to heater 106, body 98, and cooled pin member 100. That is, sleeve 102 may include a central bore 124 that threadingly engages heated pin member 104, and an outer annular surface over which heater 106 may be press fit, wire wrapped, brazed, cast, tight clearance fit, or clamped on. Sleeve 102 may also threadingly engage connected bore 110 of body 98. The engagement between sleeve 102, heated pin member 104, and heater 106 may facilitate the conductive transfer of heat from heater 106 to heated pin member 104. Sleeve 102 may also include a flange portion 128 situated at an opposing end of sleeve 102. Flange portion 128 may axially support and position heater 106. A central opening 130 within flange portion 128 may allow for injections of fuel through sleeve 102. Bellville washer 80, as described above, may be pressed by mixing plate 48 against flange portion 128 to retain injector 46 within housing 44 (referring to FIGS. 2 and 3).

A nib 132 may be situated within central opening 130 to serve as a sealing surface. That is, an internal surface of nib 132 may be finely machined to seal against an outer surface of a second nib 134 positioned within heated pin member 104. Nib 134 may include a pilot injection orifice 131 and a main injection orifice 133. It is contemplated that nib 134 may also contain additional orifices. When nib 134 is seated against nib 132, fuel may be prevented from flowing around nib 134, except through precision slots (not shown) that allow fuel to flow between nibs 132 and 134 and be injected. Instead, when situated properly, the fuel may be forced to flow through the injection orifices of nib 134. By providing the internal sealing surface on nib 132, rather than on the internal surfaces of sleeve 102 at central opening 130, the fabrication of sleeve 102 may be simplified.

Heated pin member 104 may embody a generally cylindrical member and, as described above, may be threadingly received within sleeve 102. Heated pin member may be configured to retain and/or focus the thermal energy received from heater 106 into a nozzle portion of injector 46. Heated pin member 104 may receive pilot fuel from cooled pin member 100 and direct the pilot fuel to nib 134 for injection into combustion canister 54 (referring to FIG. 3). A separation 135 may be maintained between heated pin member 104 and cooled pin member 100 (i.e., only a reduced area raised portion of cooled pin member 100 may contact heated pin member 104) to reduce or minimize the conductance of heat therebetween. In addition, that portion of heated pin member 104 extending past an upstream end of heat shield 108 may be prevented from contact with sleeve 102 such that conductive heat transfer at that location may be reduced or minimized. It should be noted, however, that even though a separation may be maintained between cooled and heated pin members 100, 104, a fluid seal may still be in place (e.g., by way of a gasket, interference fit, or other means). Further, the cross sectional area of sleeve 102 and/or body 98 may be reduced or minimized at this location to further restrict heat transfer to the cooled portions of injector 46.

Heater 106 may include an electrical coil element or coil winding 136 disposed within a body that is press-fit onto sleeve 102, and a single electrical lead wire 138 used to direct current to coil winding 136. In order to generate a flow of current through heater 106, housing 44, mixing plate 48, bellville washer 80, and sleeve 102 may be grounded. With the intention of minimizing the likelihood of short-circuiting between electrical lead wire 138 and housing 44, electrical lead wire 138 may be insulated from housing 44. Electrical lead wire 138 may extend from coil winding 136 in a vertical direction substantially parallel with an axial direction of cooled and heated pin members 100, 104 such that the effects of gravity and vibration on electrical lead wire 138 may be reduced or minimized. It is contemplated that electrical lead wire 138 may, alternatively, extend from coil winding 136 in a horizontal or other direction, if desired.

Figure 3:
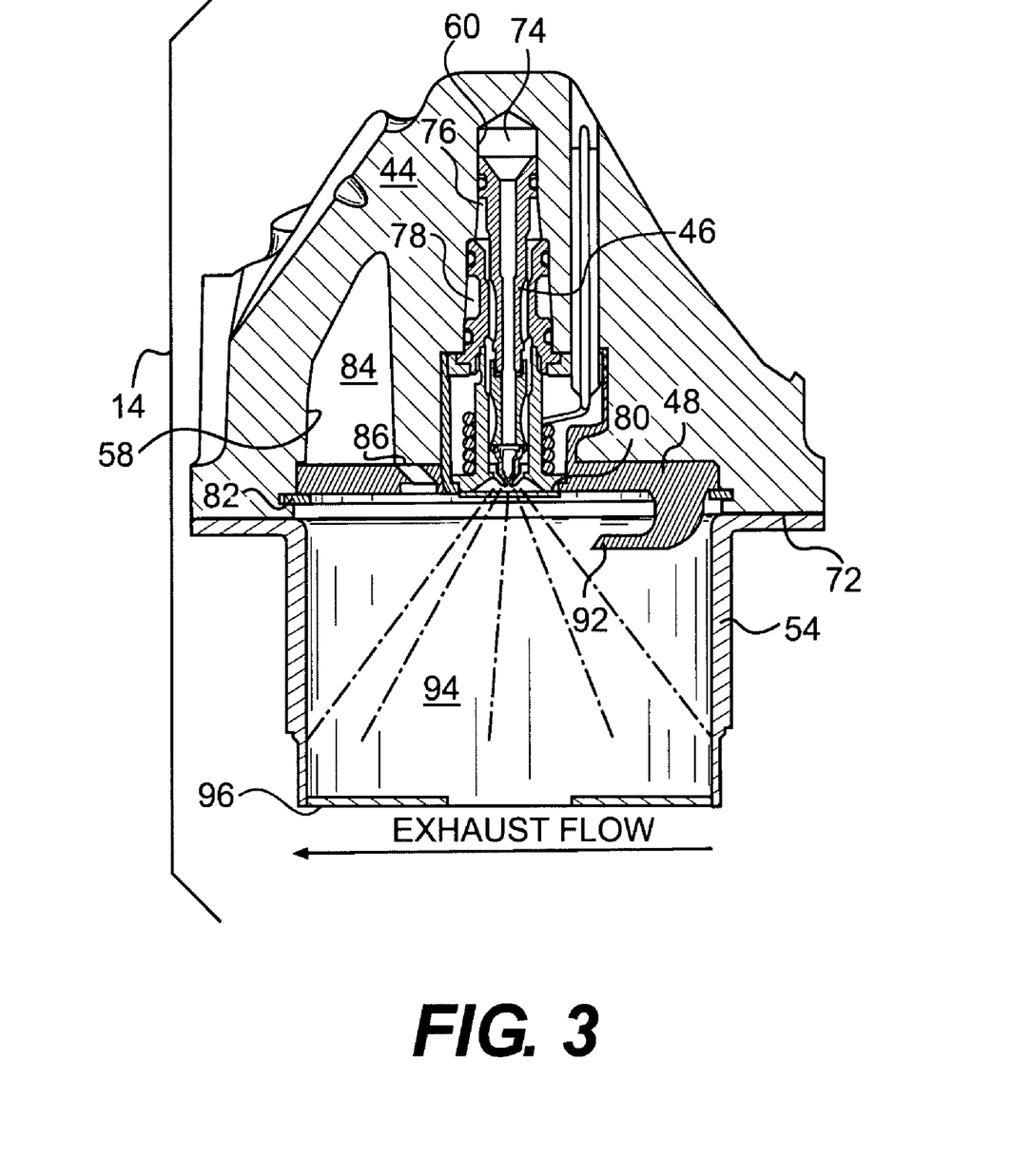
FIG. 3 is a cross-sectional illustration of the exhaust treatment device of FIG. 2.

Heat shield 108 may substantially enclose heater 106 to reduce or minimize the amount of thermal energy convected and/or radiated to the air within distribution passage 84 (referring to FIG. 3). That is, heat shield 108 may annularly surround coil winding 136 and be spaced apart from coil winding 136 such that an insulative air gap 137 within heat shield 108 is created. The annular portion of heat shield 108 may include a radial protrusion that accommodates the connection of coil winding 136 to electrical lead wire 138. By including a protrusion rather than simply increasing a diameter of heat shield 108 to accommodate the connection to electrical lead wire 138, the space within housing 44 consumed by heat shield 108 may be reduced or minimized. Heat shield 108 may be formed around flange portion 128 on one end. In addition, a cap member or end cap 140 may be placed to close off the opposing upstream end of heat shield 108, thereby preventing, reducing, or minimizing heat transfer to body 98. Electrical lead wire 138 may pass through a hole in end cap 140.

Figure 5:
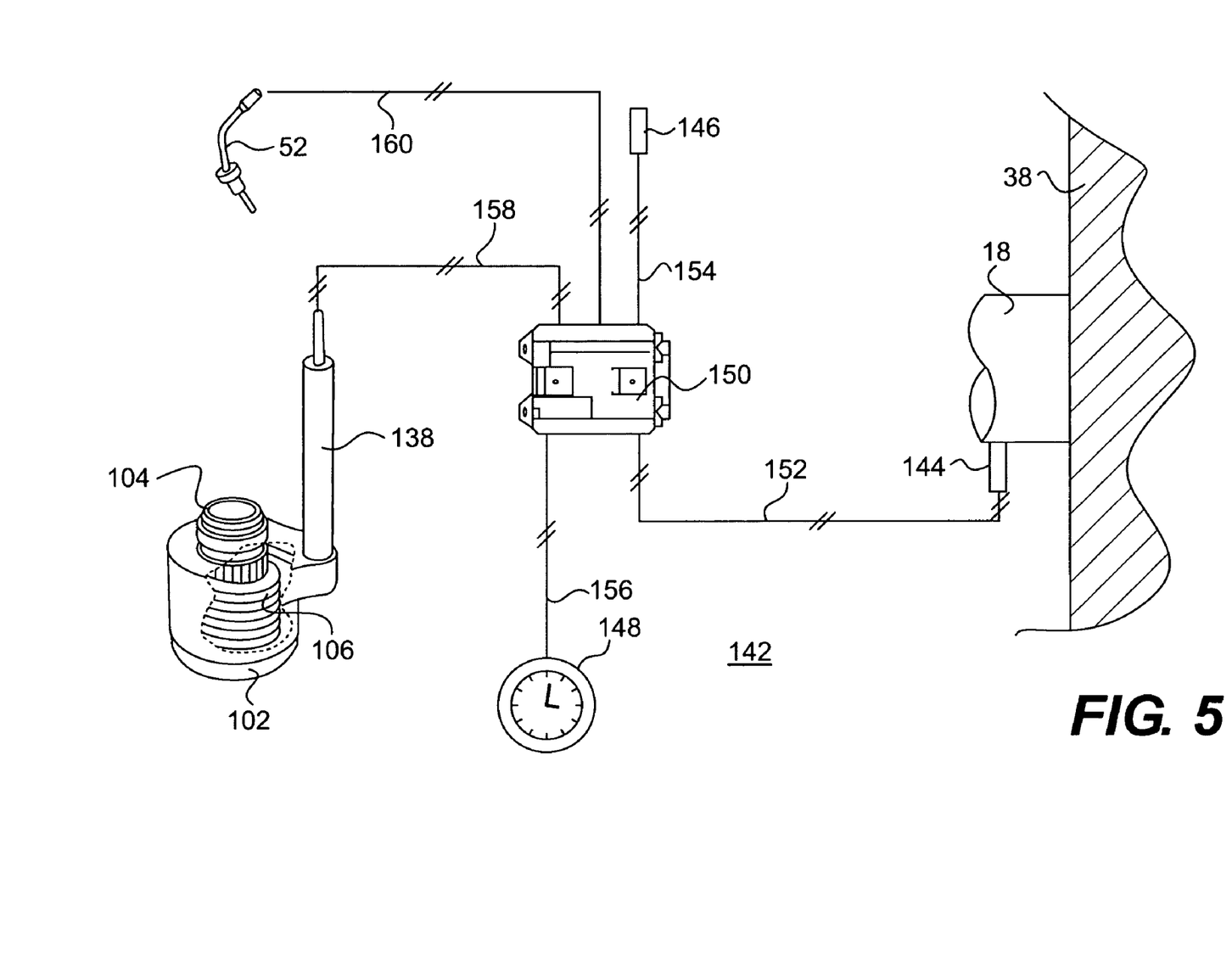
FIG. 5 is a schematic and diagrammatic illustration of an exemplary disclosed control system for use the device of FIGS. 2 and 3.

FIG. 5 illustrates a control system 142 utilized to regulate purging operations of injector 46. Control system 142 may include an engine speed sensor 144, a coolant sensor 146, a timer 148, and a controller 150. Controller 150 may be in communication with engine speed sensor 144, coolant sensor 146, timer 148, electrical lead wire 138 of heater 106, and thermocouple 52 via communication lines 152, 154, 156, 158, and 160, respectively. Controller 150 may regulate the temperature of heater 106 based on input from engine speed sensor 144, coolant sensor 146, timer 148, and/or thermocouple 52. It is contemplated that controller 150 could alternatively regulate the temperature of heater 106 based on additional or different input, if desired.

Engine speed sensor 144 may sense a rotational speed of power unit 10 and embody, for example, a magnetic pickup sensor associated with crankshaft 18 or gear train 38. Engine speed sensor 144 may be disposed proximal a magnetic element (not shown) embedded within crankshaft 18, within an element of gear train 38 or within any other component directly or indirectly driven by power unit 10 to produce a signal corresponding to the rotational speed of the resulting magnetic field. The speed signal may be sent to controller 150 by way of communication line 152.

Coolant sensor 146 may be associated with coolant flowing through injector 46 and/or coolant circulated throughout power unit 10 (i.e., throughout engine block 16, heads associated with combustion chambers 17, and other components of power unit 10). Coolant sensor 146 may be a temperature type sensor configured to generate a signal indicative of the coolant in contact therewith. The temperature signal may be directed to controller 150 by way of communication line 154.

Timer 148 may be a digital or analog type device configured to indicate a time elapsed since a regeneration event, a time remaining until a next regeneration event, a time duration of a regeneration event, a time elapsed since a purging event, a time remaining until a next purging event, a time duration of a purging event, or any other similar time measurement. Timer 148 may generate a signal indicative of the time measurement and send this signal to controller 150 by way of communication line 156.

Controller 150 may embody a single microprocessor or multiple microprocessors that include a means for controlling a purge operation of injector 46. Numerous commercially available microprocessors can be configured to perform the functions of controller 150. It should be appreciated that controller 150 could readily embody a general power unit microprocessor capable of controlling numerous power unit functions. Various other known circuits may be associated with controller 150, including power supply circuitry, signal-conditioning circuitry, solenoid driver circuitry, communication circuitry, and other appropriate circuitry.

Controller 150 may include one or more maps stored within an internal memory of controller 150 and may reference these maps to determine a temperature, a heating duration, and/or a current associated with the activation of heater 106 for various purge operations. Each of these maps may include a collection of data in the form of tables, graphs, and/or equations. In one example, a desired type of purge process may be referenced with a 2- or 3-D table used to determine the resulting temperature and/or duration appropriate for purging injector 46. In another example, the desired temperature and/or duration, and an available source voltage may form the coordinate axis of another 2- or 3-D table used to determine a current applied to electrical lead wire 138 of heater 106 that results in the desired temperature. Controller 150 may compare the desired type of purge process and available source voltage with these maps to determine a desired temperature, a heating duration, and a required current waveform, in response to the comparison. For the purposes of this disclosure, the combination of current levels induced within heater 106 and the durations thereof used to produce a single purge event may be considered a current waveform.

Controller 150 may then direct the predetermined or generated current waveform to heater 106 via electrical lead wire 138 at the appropriate timing to achieve the desired temperature for the desired heating duration. In one example, controller 150 may regulate the operation of heater 106 in an open loop routine based on the data from the maps described above. Alternatively, controller 150 may regulate the operation of heater 106 in a closed loop routine based on the data from the maps and input from thermocouple 52 and/or other sources, if desired.

Controller 150 may send predetermined or generated waveforms to heater 106 in response to receiving or recognizing a trigger. Specifically, controller 150 may activate heater 106 in response to the end of a successful regeneration event, in response to a failed regeneration event indicating clogging of injector 46 (regeneration events may include injection events), and/or in response to an elapsed period of time since a previous purging event. In one example, the elapsed period of time may be about 25 hrs. It is contemplated that other and/or additional triggers may be utilized to initiate a heating event, if desired.

Controller 150 may be configured to only activate heater 106 if certain conditions are satisfied. These conditions may include, among other things, the speed of power unit 10 being above a predetermined speed threshold, the temperature measured by coolant sensor 146 being above a predetermined temperature threshold, a minimum time elapsed since a regeneration event, and a minimum amount of time remaining until a next regeneration event. In one example, the predetermined speed threshold may be about 600 rpm or the idle speed of power unit 10, such that engine operation is ensured during the purge event. In this same example, the predetermined temperature threshold may be about 65° C., such that the temperature generated by heater 106 may be sufficient to burn away any residual fuel or other built-up material. To avoid creating deposits in non-heated portions of injector 46, it may be desired to wait a minimum period of time after a regeneration event has occurred, before initiating a purge event. In some cases, this minimum period of time may be about 3,600 seconds. The time period required for purging (i.e., that time required for burning deposits within injector 46) may be between 3,600 and 14,400 seconds. Thus, a purge event may only be allowed if sufficient time remains until a pending regeneration event. It is contemplated that other or additional conditions may also be satisfied before purging, if desired.

Depending on the desired purge event, controller 150 may activate heater 106 to achieve differing temperatures for different time durations. For example, if the purge event is immediately following a regeneration event and only evaporation of residual fuel is desired, the temperature of heater 106 may only be increased to about 300° C. for about 10-15 min. In contrast, if the purge event is a standard periodic purge (i.e. about 25 hrs. have elapsed since the previous purge event), the required temperature may be higher and the heating duration may be longer. For example, a periodic purge event may include temperatures of about 475° C. that endure for about 1 hr. If the purge event is associated with a failed regeneration event (i.e., injection event of regeneration event failed because injector 46 is plugged), the temperature of the purge event could be even higher for a longer period of time. It is contemplated that controller 150 may also continuously warm injector 46 to a moderate temperature such that extreme temperature differentials are reduced or minimized and the time to reach purge temperature levels is reduced. It should be noted that the temperatures and durations described above are associated with a fuel such as diesel fuel, and the temperatures and durations may change when a different fluid (e.g., bio-diesel, urea, etc.) is directed through injector 46. It should also be noted that the above described time durations are associated with an elapsed time at the appropriate temperature and not necessarily the time elapsed since start of the purge process.

Figure 6:
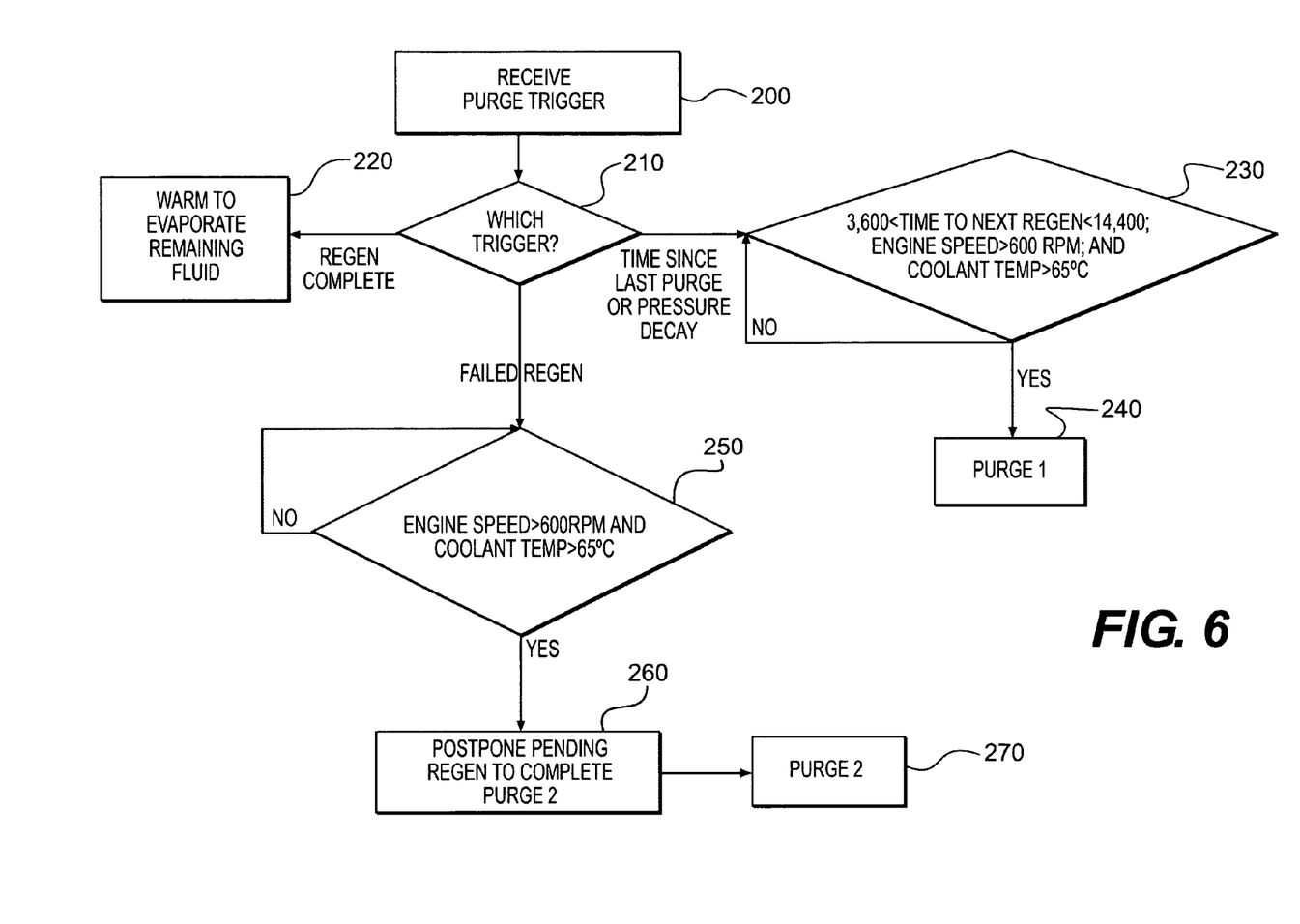
FIG. 6 is a flowchart depicting an exemplary method performed by the control system of FIG. 5 to purge the fluid injector of FIG. 4.

FIG. 6 illustrates an exemplary method of purging injector 46. FIG. 6 will be described in detail in the following section to better illustrate the disclosed system and its operation.

INDUSTRIAL APPLICABILITY

The fluid injector of the present disclosure may be applicable to a variety of exhaust treatment devices including, for example, particulate traps requiring periodic regeneration, catalytic converters requiring a predetermined temperature for optimal operation, SCR devices requiring the injection of ammonia or another catalyst, and other similar devices known in the art. In fact, the disclosed injector may be implemented into any engine system that benefits from clog-free injector operation. The operation of power unit 10 will now be explained.

Referring to FIG. 1, air and fuel may be drawn into combustion chambers 17 of power unit 10 for subsequent combustion. Specifically, fuel from fuel system 12 may be injected into combustion chambers 17 of power unit 10, mixed with the air therein, and combusted to produce a mechanical work output and an exhaust flow of hot gases. The exhaust flow may contain a complex mixture of air pollutants composed of gaseous and solid material, which can include particulate matter. As this particulate laden exhaust flow is directed from combustion chambers 17 through exhaust treatment device 40, particulate matter may be strained from the exhaust flow by filtration medium 42. Over time, the particulate matter may build up in filtration medium 42 and, if left unchecked, the buildup could be significant enough to restrict, or even block the flow of exhaust through exhaust treatment device 40. As indicated above, the restriction of exhaust flow from power unit 10 may increase the backpressure of power unit 10 and reduce the unit's ability to draw in fresh air, resulting in decreased performance of power unit 10, increased exhaust temperatures, and poor fuel consumption.

To prevent the undesired buildup of particulate matter within exhaust treatment device 40, filtration medium 42 may be regenerated. Regeneration may be periodic or based on a triggering condition, such as, for example, an elapsed time of engine operation, a pressure differential measured across filtration medium 42, a temperature of the exhaust flowing from power unit 10, or any other condition known in the art.

To initiate regeneration, injector 46 may be caused to selectively pass fuel into exhaust treatment device 40 at a desired rate (i.e., injection event). As a pilot injection of fuel from injector 46 sprays into combustion canister 54, a spark from spark plug 50 may ignite the fuel. As a main injection of fuel from injector 46 is passed into exhaust treatment device 40, the burning pilot flow of fuel may ignite the main flow of fuel. The ignited main flow of fuel may then raise the temperature of the particulate matter trapped within filtration medium 42 to the combustion level of the entrapped particulate matter, burning away the particulate matter and, thereby, regenerating filtration medium 42.

Between regeneration events (the regeneration events including injection events), injector 46 may be selectively purged of fuel and any accumulated buildup (i.e., heat to evaporate or burn away fuel and/or accumulated buildup) to ensure proper operation thereof. One exemplary injector purge process is illustrated in the flowchart of FIG. 6. The purge process may begin when a purge trigger is received or recognized by controller 150 (Step 200). Purging may be triggered in a number of different ways. For example, purging may be triggered when a time elapsed since a previous purge event has exceeded a threshold time period. In some situations, this threshold time period may be in the range of 20-60 hours and, more specifically, about 25 hours. In another example, purging may be triggered after the successful completion of each regeneration event described above. In yet another example, purging may be triggered when a regeneration event has failed (i.e., when ignition of the injected fuel can not be confirmed, when a temperature of the particulate matter has failed to reach its combustion threshold temperature, and/or when too many losses of combustion during a regeneration event have occurred). It is contemplated that other purge triggers may also or alternatively be employed, if desired.

The next step after initiating the desired purge process, may include determining what triggered the desired purge process (Step 210). As described above, purge processes may be triggered in a number of different ways. If the trigger is the successful completion of a regeneration event, the desired purge process may include only the warming of injector 46 to evaporate any fuel remaining within heated pin member 104 and nibs 132 and 134 (Step 220). If warming is desired, controller 150 may reference the maps stored in memory thereof and direct the appropriate waveform to heater 106 such that the temperature of heater 106 reaches about 300° C. and is maintained for about 10-15 minutes.

However, if the trigger is an amount of time elapsed since a previous purge event or an abnormal pressure decay rate of fuel within injector 46, a purge event requiring a higher temperature and/or heating duration may be required (Purge 1). However, before Purge 1 can be initiated, controller 150 may compare current power unit operating conditions to predetermined threshold conditions and determine if purging at level 1 (i.e., Purge 1) can be allowed (Step 230). Specifically, if the time since a previous regeneration event is greater than the minimum threshold (about 3,600 seconds) and the time until the next regeneration event is greater than the time required for the currently desired purging process (about 1-4 hours), power unit 10 is operational (i.e., engine speed is greater than about 600 rpm), and the amount of heat produced by heater 106 will be sufficient to evaporate or burn away residual fuel and/or buildup (i.e., coolant temperature is greater than about 65° C.), then controller 150 may initiate the desired purge process (Step 240). At this level of purging (i.e., Purge 1 illustrated in FIG. 6), the waveform directed by controller 150 to heater 106 may result in temperatures up to about 475° C. being maintained for a duration of about one hour.

If the trigger is a failed regeneration event, it may be concluded that injector 46 may be at least partially clogged (i.e., failed injection event). In order to unclog injector 46, the temperature and duration of heater 106 may be increased even further (i.e., Purge 2 illustrated in FIG. 6 may be implemented). Similar to the requirements for Purge 1, before Purge 2 can be initiated, controller 150 may compare current power unit operating conditions to predetermined threshold conditions and determine if Purge 2 can be allowed (Step 250). In this situation, time may not be a factor. That is, because injector 46 may be at least partially clogged, purging at level 2 (i.e., Purge 2) may be accomplished regardless of the time until a pending regeneration event. In some situations, this may require the pending regeneration event be postponed (Step 260) to allow sufficient time for purging. As long as power unit 10 is operational (i.e., engine speed is greater than about 600 rpm), and the amount of heat produced by heater 106 will be sufficient to evaporate or burn away residual fuel and/or buildup (i.e., coolant temperature is greater than about 65° C.), then controller 150 may initiate the desired purge process (Step 270). At this level of purging (i.e., Purge 2 illustrated in FIG. 6), the waveform directed by controller 150 to heater 106 may result in temperatures that exceed 475° C. for more than one hour. It is contemplated that, after a failed regeneration event, purging in an attempt to unclog injector 46 may be limited to a predetermined number of events. That is, if, for example, a regeneration event fails after just completing a purge event at level 2, other precautionary measures may be taken such as warning an operator of power unit 10, shutting down power unit 10, and other such measures, if desired.

The disclosed injector configuration may ensure continued and successful regeneration events by removing residual fuel and buildup therefrom in an efficient manner. Specifically, by heating a nozzle portion of the injector (i.e., that portion of injector 46 spraying fuel into combustion canister 54), both residual liquids and solid buildup therein may be efficiently burned away. By removing both the liquids and the solids, the successful operation of the disclosed injector may be prolonged, as compared to a purge system that only removes a bulk of the liquids. In addition, the different levels of purging may clean the disclosed injector in an efficient manner, by only purging to the amount necessary at a give time. Further, because a separate fluid purge system may be unnecessary, the complexity and cost of the disclosed injector and associated purge system may be reduced.

It will be apparent to those skilled in the art that various modifications and variations can be made to the fluid injector of the present disclosure without departing from the scope of the disclosure. Other embodiments will be apparent to those skilled in the art from consideration of the specification and practice of the injector disclosed herein. For example, although the disclosed injector is illustrated as drawing pressurized fuel from a fuel system, the disclosed injector may alternatively draw pressurized fuel from a separate dedicated source, if desired. Further, although general examples have illustrated the disclosed injector as being associated with fuel for particulate regeneration purposes, it is contemplated that injector 46 may just as easily be used to inject ammonia, AdBlue, and/or urea within a Selective Catalytic Reduction (SCR) device, if desired. In addition, it is contemplated that the disclosed heater and control system may be combined with an air- or chemical-purging system to more effectively remove liquid fuel and/or residue from the disclosed injector, if desired. It is intended that the specification and examples be considered as exemplary only, with a true scope of the disclosure being indicated by the following claims and their equivalents.

What is claimed is:

1. A fluid injector for an exhaust treatment system, comprising:
　a nozzle portion;
　a heater associated with the nozzle portion;
　a spark plug associated with the nozzle portion;
　a timer; and
　a controller in communication with the spark plug, the timer, and the heater, the controller being configured to:
　　activate the spark plug during a regeneration event;
　　recognize a condition triggering a purge event of the fluid injector; and
　　activate the heater to purge the fluid injector in response to the recognized condition, wherein the condition is a predetermined period of time having elapsed since a previous purge event, the controller being configured to communicate with the timer and activate the heater to purge the fluid injector when the predetermined period of time has elapsed since the previous purge event.

2. The fluid injector of claim 1, further including an engine speed sensor, wherein the controller is in communication with the engine speed sensor and verifies that a speed of an associated engine is greater than a threshold speed prior to activating the heater.

3. The fluid injector of claim 2, further including a coolant sensor configured to generate a first signal indicative of a coolant temperature, wherein the controller is in communication with the coolant sensor and verifies that the first signal indicates the coolant temperature is greater than a predetermined threshold temperature prior to activating the heater.

4. The fluid injector of claim 3, wherein the timer is configured to generate a second signal indicative of a time until a next injection event of the fluid injector, wherein the controller is in communication with the timer and verifies that the second signal indicates the time until the next injection event is greater than a predetermined period of time prior to activating the heater, wherein the predetermined period of time varies in response to a type of a desired purge event.

5. The fluid injector of claim 3, wherein the timer is configured to generate a second signal indicative of a time elapsed since a previous injection event, wherein the controller is in communication with the timer and verifies that the second signal indicates the time elapsed since the previous injection event is greater than a predetermined period of time prior to activating the heater.

6. The fluid injector of claim 1, wherein a plurality of injector related conditions can trigger a purge event.

7. The fluid injector of claim 6, wherein the controller is configured to vary activation of the heater based on which of the plurality of injector related conditions has triggered a current purge event of the fluid injector, wherein varying activation includes at least one of varying a purge duration and varying a purge temperature.

8. The fluid injector of claim 6, wherein one of the plurality of injector related conditions includes the successful completion of an injection event.

9. The fluid injector of claim 8, further including a temperature sensor associated with the fluid injector, wherein the controller is in communication with the temperature sensor and determines the injection event is successfully completed based on a signal from the temperature sensor.

10. The fluid injector of claim 6, wherein one of the plurality of injector related conditions includes a failed injection event.

11. The fluid injector of claim 10, further including a temperature sensor associated with the fluid injector, wherein the controller is in communication with the temperature sensor and determines an injection event has failed based on a signal from the temperature sensor.

12. A method for purging a fluid injector for use in an exhaust treatment system, comprising:
　activating the fluid injector to perform a regeneration event;
　recognizing at least one condition triggering a purge event of the fluid injector in the exhaust treatment system, wherein recognizing at least one condition includes recognizing a completion of an injection event indicating completion of the regeneration event; and heating the fluid injector to purge fluid or buildup from the fluid injector in response to the at least one recognized condition.

13. The method of claim 12, further including sensing an engine speed, wherein the at least one recognized condition includes the sensed engine speed being greater than a threshold speed of about 600 rpm.

14. The method of claim 13, further including sensing a coolant temperature, wherein the at least one recognized condition includes the sensed coolant temperature being greater than a predetermined threshold temperature of about 65° C.

15. The method of claim 14, further including tracking time until a next injection event of the fluid injector, wherein the at least one recognized condition includes the time until the next injection event being greater than a predetermined period of time of about 1-4 hrs, wherein the predetermined period of time varies in response to a type of a desired purge event.

16. The method of claim 12, wherein the at least one condition includes a plurality of injector related conditions.

17. The method claim 16, further including varying the heating of the fluid injector based on which of the plurality of injector related conditions has triggered heating of the fluid injector, wherein varying the heating includes at least one of varying a heating duration and varying a heating temperature.

18. The method of claim 12, further including sensing a temperature associated with the fluid injector, wherein the injection event is deemed successfully completed based on the sensed temperature.

19. The method of claim 12, wherein, when the injection event has been successfully completed, heating includes warming the fluid injector for a predetermined period of time to evaporate fluid remaining within the fluid injector.

20. The method of claim 16, further including tracking a time elapsed between purge events, wherein one of the plurality of injector related conditions includes a predetermined period of time elapsed since a previous purge event.

21. The method of claim 16, wherein one of the plurality of injector related conditions includes a failed injection event.

22. The method of claim 21, wherein, when the injection event has failed, heating includes elevating a temperature of the fluid injector to a temperature greater than 475° C. for an period of time greater than 1 hr.

23. An exhaust treatment system, comprising:
a power unit that creates exhaust;
a passageway configured to receive the exhaust;
a fluid injector configured to inject fluid into the exhaust to achieve a regeneration event;
a heater associated with a fluid injecting end of the fluid injector; and
a controller in communication with the heater, the controller being configured to:
recognize a condition triggering a purge event of the fluid injector; and
activate the heater to purge fluid or buildup from the fluid injector in response to the recognized condition, wherein recognizing a condition includes recognizing a completion of an injection event indicating completion of the regeneration event, wherein the controller is configured to activate the heater prior to a next regeneration event such that the time until the next regeneration event is greater than a predetermined period of time.

* * * * *